United States Patent
Redon

(10) Patent No.: US 11,898,448 B2
(45) Date of Patent: Feb. 13, 2024

(54) HYDROGEN-POWERED OPPOSED-PISTON ENGINE

(71) Applicant: Achates Power, Inc., San Diego, CA (US)

(72) Inventor: Fabien G. Redon, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 17/870,036

(22) Filed: Jul. 21, 2022

(65) Prior Publication Data

US 2023/0025982 A1    Jan. 26, 2023

Related U.S. Application Data

(60) Provisional application No. 63/224,721, filed on Jul. 22, 2021.

(51) Int. Cl.

| F02B 75/28 | (2006.01) |
|---|---|
| F02M 21/02 | (2006.01) |
| F01B 7/14 | (2006.01) |
| F02B 43/10 | (2006.01) |
| F02D 41/00 | (2006.01) |
| F02B 75/02 | (2006.01) |

(52) U.S. Cl.
CPC .............. *F01B 7/14* (2013.01); *F02B 43/10* (2013.01); *F02B 75/282* (2013.01); *F02D 41/0027* (2013.01); *F02B 2075/025* (2013.01)

(58) Field of Classification Search
USPC ........ 123/50 A, 50 B, 51 R, 51 A, 51 B, 445
See application file for complete search history.

(56) References Cited

U.S. PATENT DOCUMENTS

| 2,440,310 | A | * | 4/1948 | Thege ................... F02B 25/00 |
|---|---|---|---|---|
| | | | | 123/51 R |
| 5,115,768 | A | * | 5/1992 | Peschka ................. F02B 43/10 |
| | | | | 123/289 |
| 7,059,114 | B2 | | 6/2006 | Tang et al. |
| 7,111,452 | B2 | | 9/2006 | Miyoshi et al. |
| 7,117,830 | B1 | | 10/2006 | Boyer et al. |
| 7,448,348 | B2 | | 11/2008 | Shinagawa et al. |
| 7,487,750 | B2 | | 2/2009 | Leone et al. |

(Continued)

FOREIGN PATENT DOCUMENTS

| CN | 107143421 A | 9/2017 | .............. F02B 43/10 |
|---|---|---|---|
| DE | 3731986 A1 * | 4/1989 | |

(Continued)

OTHER PUBLICATIONS

DE 102019213133 A1—English Translation (Year: 2021).*

(Continued)

*Primary Examiner* — George C Jin
*Assistant Examiner* — Teuta B Holbrook
(74) *Attorney, Agent, or Firm* — Terrance A. Meador

(57) ABSTRACT

A two-stroke cycle uniflow-scavenged opposed-piston engine is configured to use hydrogen fuel. The opposed-piston engine has at least one cylinder and a pair of pistons disposed for opposed motion in a bore of the cylinder. Hydrogen fuel is injected into the cylinder early in a compression stroke of the opposed-piston engine, and is ignited in a combustion chamber formed between the pistons late in the compression stroke.

22 Claims, 4 Drawing Sheets

(56) References Cited

U.S. PATENT DOCUMENTS

| | | | |
|---|---|---|---|
| 7,740,010 B2 | 6/2010 | Fulton et al. | |
| 7,789,047 B2 | 9/2010 | Kuroki et al. | |
| 9,211,797 B2 * | 12/2015 | Abani | F01B 7/02 |
| 10,415,512 B2 | 9/2019 | Kimura | |
| 10,465,616 B2 | 11/2019 | Redon et al. | |
| 2006/0236988 A1 * | 10/2006 | Adler | F02D 19/022 |
| | | | 123/557 |
| 2010/0282219 A1 | 11/2010 | Alonso | |
| 2013/0055984 A1 * | 3/2013 | Snell | F02B 75/282 |
| | | | 123/25 R |
| 2014/0102418 A1 * | 4/2014 | Babu | F02B 75/282 |
| | | | 123/51 R |
| 2016/0138499 A1 | 5/2016 | Dion et al. | F02D 41/00 |
| 2016/0195028 A1 | 7/2016 | Redon et al. | |
| 2016/0341104 A1 | 11/2016 | Redon | |
| 2017/0030262 A1 | 2/2017 | Venugopal | F02B 75/282 |
| 2017/0254261 A1 * | 9/2017 | Morton | F02B 75/24 |
| 2018/0264441 A1 * | 9/2018 | Bosteels | B01J 21/18 |
| 2020/0284148 A1 * | 9/2020 | Binder | F01C 1/348 |
| 2021/0054781 A1 * | 2/2021 | Nishida | F02B 63/042 |

FOREIGN PATENT DOCUMENTS

| | | | | |
|---|---|---|---|---|
| DE | 102017116648 A1 * | 1/2019 | | |
| DE | 202020002296 U1 | 7/2020 | | F02B 75/22 |
| DE | 102019213133 A1 * | 3/2021 | | |
| GB | 2567704 A * | 4/2019 | | F02D 19/0644 |
| JP | H09 242558 A | 9/1997 | | F02B 75/28 |
| JP | 2007-198275 A | 8/2007 | | F02D 19/02 |
| JP | 2016-109111 A | 6/2016 | | F02F 1/00 |
| JP | 2017214934 A * | 12/2017 | | F02D 19/0644 |
| JP | 2021025488 | 2/2021 | | F02B 75/28 |
| WO | 2004/101972 A1 | 11/2004 | | F02B 43/10 |
| WO | WO-2008016289 A1 * | 2/2008 | | F02B 75/1896 |
| WO | WO-2014053167 A1 * | 4/2014 | | F02B 19/108 |
| WO | WO-2015004668 A1 * | 1/2015 | | B60K 6/24 |
| WO | WO-2020249277 A1 * | 12/2020 | | F02B 17/005 |
| WO | 2023/004017 A1 | 1/2023 | | F01B 7/14 |

OTHER PUBLICATIONS

JP 102019.*
Yip, Ho Long et al. A Review of Hydrogen Direct Injection for Internal Combustion Engines: Towards Carbon-Free Combustion. Applied Sciences. 2019, 9, 4842-4872.
International Search Report and Written Opinion for PCT/US2022/037835, dated Nov. 28, 2022.
Non-Final Office Action dated Jun. 13, 2023 in U.S. Appl. No. 18/108,975.
Amendment and Request for Reconsideration dated Oct. 11, 2023 in U.S. Appl. No. 18/108,975.
International Search Report and Written Opinion for PCT/US2023/012934, dated Jun. 28, 2023.

* cited by examiner

HYDROGEN-POWERED OPPOSED-PISTON ENGINE

PRIORITY

This application claims priority to U.S. Provisional Application for Patent 63/224,721, filed Jul. 22, 2021.

FIELD

The field includes opposed-piston internal combustion engines. More particularly, the field includes opposed-piston engines that are configured to burn hydrogen as fuel.

BACKGROUND

A two-stroke cycle opposed-piston engine has benefits that allow for higher efficiency than a 4-stroke engine. For example, an opposed-piston engine has a lower surface-area-to-volume ratio, which produces less heat loss than a 4-stroke engine. Further, two-stroke operation of the engine inherently reduces the mean effective cylinder pressure, thereby enabling faster combustion without excessive mechanical stress. In addition, an air handling system of an opposed-piston system affords full control of air charging by way of a pumping arrangement decoupled from the base engine operation. This type of opposed-piston engine is disclosed, for instance, by US Patent Application Publication 2016/0369686, US Patent Application Publication 2017/0204801, and US Patent Application Publication 2017/0204790.

The above type opposed-piston engine typically operates by combustion of diesel fuel, which is ignited by heat generated by compression of air. Diesel combustion presents challenges related to emissions, particularly in generating greenhouse gasses and producing soot. These challenges are being met in opposed-piston engine technology by fundamental advantages of the engine, by adaptation of exhaust after-treatment strategies, and by advances in combustion technology. Nevertheless, as effective as these solutions are becoming, they still add layers of technical complexity and cost to the design, development, and production of opposed-piston engines. Alternative combustion technologies may provide simpler less expensive solutions to emissions challenges, without surrendering the benefits of opposed-piston performance. For example, internal combustion engines have been adapted to run on natural gas and propane. However, these fuels contain carbon and produce undesirable emissions when burned, therefore requiring complex and costly mitigation.

Hydrogen, however, is carbon-free. Furthermore, combustion of hydrogen ($H_2$) under lean conditions can significantly reduce undesirable NOx emissions. A convenient measure of "leaness" is lambda ($\lambda$), a dimensionless ratio of an amount of air present in a combustion chamber to the amount of air required to fully burn the fuel present.

SUMMARY

The above type opposed-piston engine is typically fueled by diesel and operated according to a two-stroke cycle, and it is constructed and controlled in such a manner to maximize the engine's brake efficiency achievable with diesel combustion. The invention is based on the realization that when an opposed-piston engine is optimized for efficiency, its operation is leaner than that of a typical 4-stroke engine. When operating by combustion of diesel fuel, most of an opposed-piston engine's operating range is at an air-to-fuel (A/F) ratio of 27 or higher. The amount of air supplied under this condition would result in a lambda of 2.2 or higher were the engine operated by combustion of hydrogen. Combustion of hydrogen at a lambda of at least 2.2 produces almost no nitrous oxides (NOx), and does not produce other emission constituents associated with carbon-containing fuel combustion, like soot, carbon monoxide (CO), unburned hydrocarbon, and carbon dioxide ($CO_2$). Thus, an opposed-piston engine operating by combustion of hydrogen ($H_2$) would produce exhaust mainly comprising water and excess air (including oxygen and nitrogen), thereby reducing, if not eliminating, the need for after-treatment devices. Consequently, an opposed-piston engine fueled by hydrogen has the potential of preserving its full performance capability without modification of its air handling system or any additional pumping requirement, while greatly reducing, if not eliminating, production of undesirable emissions.

It is an object of the present invention to provide an opposed-piston engine constructed to combust hydrogen fuel without diminishing the excellent performance or the fundamental architecture of the engine.

The invention is an opposed-piston internal combustion engine configured to operate by combustion of hydrogen. The hydrogen-fueled opposed-piston engine includes one or more ported cylinders, in which each ported cylinder is provided with one or more fuel injection devices configured to directly inject hydrogen fuel into a bore of the cylinder, between opposing end surfaces of a pair of pistons disposed in the cylinder. One or more ignition devices are positioned on the cylinder wall to deliver an impulse into a combustion chamber formed in the cylinder bore between the end surfaces of the pistons which ignites the hydrogen fuel.

A control unit governs a combustion process of the hydrogen-fueled opposed-piston engine by causing early direct injection of the hydrogen fuel, which leverages the high diffusivity of hydrogen to enable fast air/fuel mixing for an optimal mixture at the time of ignition. A cylinder swirl environment is provided to enhance the mixing. Early injection of the hydrogen fuel maximizes the time for mixing, and encounters a low initial combustion chamber pressure, thereby reducing required injection pressure without losing hydrogen fuel during scavenging. Such early injection could also eliminate the need for a hydrogen fuel pump.

The control unit constrains the air and hydrogen fuel amounts delivered for combustion so as to maintain an air/hydrogen fuel balance within a specified lambda ($\lambda$) range which ensures a desirably lean air/hydrogen fuel mixture.

DETAILED DESCRIPTION

The term "hydrogen fuel" as used in this description and the claims which follow is not limited to a fuel composition consisting solely of pure hydrogen ($H_2$). Rather, given the currently-available means of generating fuel-grade hydrogen, and allowing for additives, it is the likely case that hydrogen fuel will comprise $H_2$ and various impurities and/or additives. Therefore, when used herein, the term "hydrogen fuel" means a fuel comprising from 95% to 100% of $H_2$.

A cylinder of an opposed-piston engine has ports through its sidewall for the passage of gas into and out of the bore of the cylinder. Such a cylinder is a "ported cylinder". A ported cylinder of an opposed-piston engine typically includes intake and exhaust ports cast, machined, or otherwise formed in respective exhaust and intake portions of its sidewall. Ported cylinders can be constituted as elements of a parent bore engine structure, or as liners (sometimes called "sleeves") received in an engine block to form cylinders.

Figure 1:
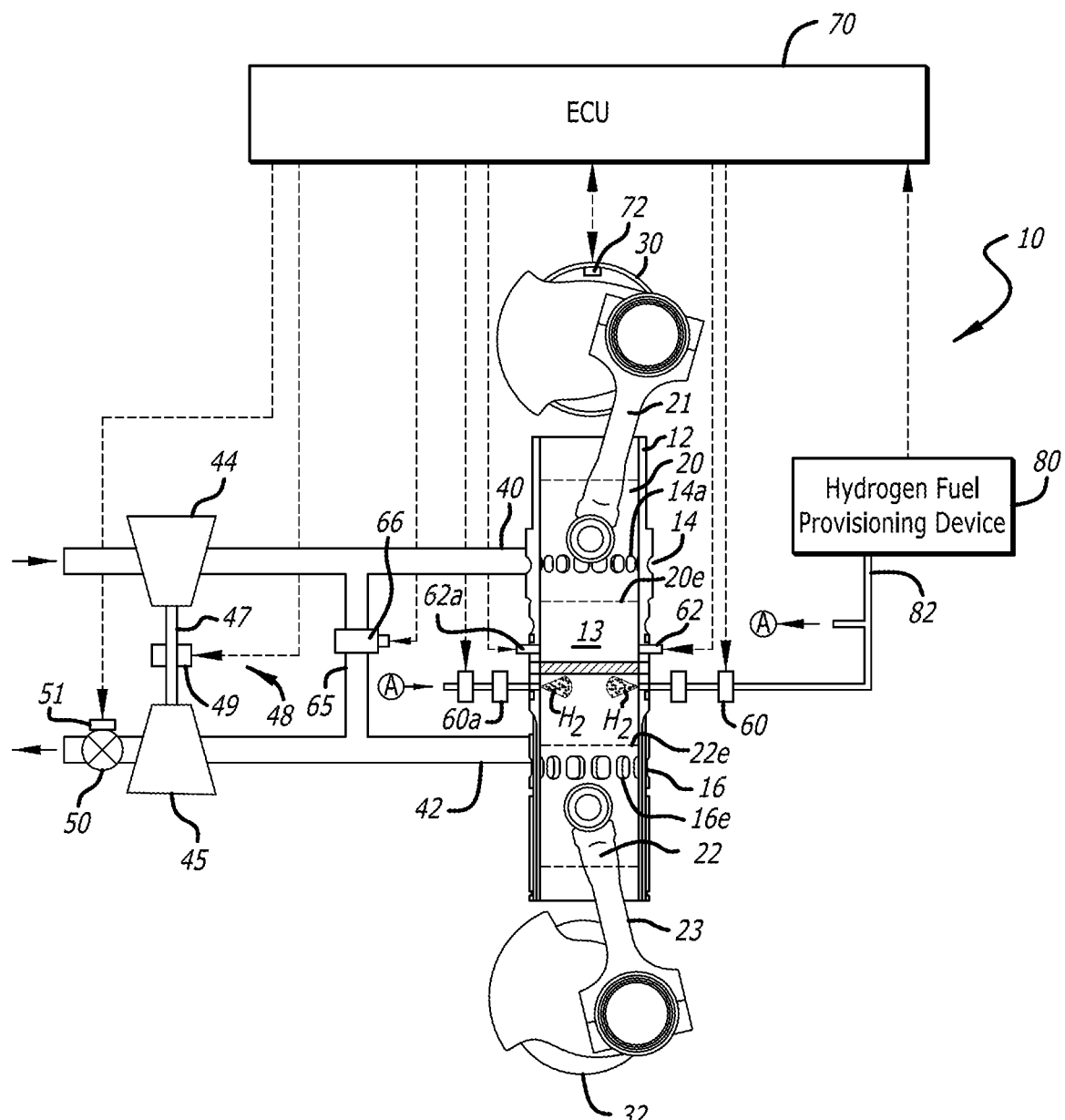
FIG. 1 is a schematic diagram which illustrates the configuration of the hydrogen-fueled opposed-piston according to a first embodiment.

A first embodiment of the hydrogen-fueled opposed-piston engine according to the invention is shown in FIG. 1. The first embodiment comprises a two-stroke-cycle uniflow scavenged opposed-piston engine 10, which is configured to combust hydrogen fuel. The engine 10 comprises a ported cylinder 12 with a bore 13 and two ports for the passage of gas. For example, the opposed-piston 10 may comprise one ported cylinder, two ported cylinders, or three or more ported cylinders. The ported cylinder 12 receives air through an intake port 14 formed in an intake portion including one end of the cylinder and discharges exhaust gas through an exhaust port 16 formed in an exhaust portion including the opposite end of the cylinder. The intake port 14 comprises a circumferential array of port openings 14i in the intake portion of the cylinder 12. The intake port openings 14i may be conventionally shaped to cause air entering the cylinder to swirl in the bore. The exhaust port 16 comprises a circumferential array of port openings 16e in the exhaust portion of the cylinder 12. The exhaust port openings 16e may be conventionally dimensioned and located to provide a blowdown time of sufficient length to initiate purging of exhaust gas from the cylinder before the intake port opens.

As illustrated in FIG. 1, the opposed-piston engine 10 includes first and second pistons 20, 22, which are disposed for mutually opposing movements in the bore 13 with their end surfaces 20e, 22e facing each other. The pistons 20, 22 are oriented in this way so as to be able to reciprocate in opposition along a longitudinal axis of the cylinder bore 13. For convenience, the first piston 20 may be referred as the "intake" piston because of its proximity to the intake port 14. Similarly, the second piston 22 may be referred as the "exhaust" piston because of its proximity to the exhaust port 16. The intake port 14 is opened and closed in response to back-and-forth movement of the intake piston 20 as it traverses the bore between its top center (TC) and bottom center (BC) locations. The exhaust port 16 is opened and closed in response to back-and-forth movement of the exhaust piston 22 as it traverses the bore between its top center (TC) and bottom center (BC) locations.

The pistons of an opposed-piston engine are connected to at least one crankshaft. In some cases, the pistons are coupled by rocker arm linkages to a single crankshaft. Preferably, as per FIG. 1, the hydrogen-fueled opposed-piston engine 10 comprises two crankshafts 30 and 32, with the intake piston 20 coupled by a connecting linkage 21 to the crankshaft 30 and the exhaust piston 22 coupled by a connecting linkage 23 to the crankshaft 32.

Operation of the hydrogen-fueled opposed-piston engine 10 (with one or more cylinders) is based on a two-stroke cycle, in which the engine completes a cycle of operation with a single complete rotation of a crankshaft and two strokes of a piston connected to the crankshaft. The strokes are denoted as an expansion stroke and a compression stroke. Each of the opposed pistons 20, 22 moves between a respective BC location in the cylinder 12 where it is nearest one end of the cylinder, and a respective TC location within the cylinder where it is furthest from the one end. During an expansion stroke, the pistons are driven away from their TC locations toward their BC locations by combustion of fuel between their end surfaces. During a compression stroke, the pistons are pushed away from their BC locations toward their TC regions by rotation of the crankshafts to which they are attached. The intake and exhaust ports 14, 16 are located near the respective BC locations of the intake and exhaust pistons. Each of the opposed pistons 20, 22 controls a respective one of the ports 14,16, opening the port as it approaches its BC location, and closing the port as it moves away from its BC location.

There may be a phase offset between the rotations of the crankshafts 30 and 32. For example, the crankshaft 32 may lead the crankshaft 30. This phase offset causes the movement of the exhaust piston 22 to lead the movement of the intake piston 20 during each two-stroke cycle of the engine. Consequently, near the end of an expansion stroke, movement of exhaust piston 22 opens the exhaust port 16 before movement of the intake piston 20 opens the intake port 14. This causes exhaust gas to begin to flow out of the cylinder 12 before air begins to flow into the cylinder 12. This initial discharge of exhaust gas is referred to as "blowdown." For a short time, following blowdown, both ports are open, and air enters the intake port 14 at an intake pressure that is higher than an exhaust pressure felt at the exhaust port 16. This pressure differential causes the exhaust gas to continue flowing out of the exhaust port. This displacement of exhaust gas by air is referred to as "scavenging". Gas flows through the cylinder in a single direction ("uniflow")—from intake port to exhaust port—and the displacement of exhaust gas by air in this manner is referred to as "uniflow scavenging". Shortly after the beginning of a compression stroke, the intake port 14 and the exhaust port 16 close, causing air to be trapped in the ported cylinder 12 for the remainder of the compression stroke.

As the pistons 20, 22 move together and apart during a cycle of engine operation, a maximum volume and a minimum volume occur. The maximum volume is defined as cylinder volume contained between the piston end surfaces 20e, 22e as the pistons move (simultaneously or sequentially) from BC; the minimum volume is defined as cylinder volume contained between the end surfaces 20e, 22e when the pistons are closest together. A representative minimum volume zone of the bore 13 is indicated by shading in FIG. 1.

As per FIG. 1, the ported cylinder 12 is provided with an intake channel 40 that conveys air to the intake port 14 and an exhaust channel 42 that conveys exhaust gas discharged through the exhaust port 16. A compressor 44 is positioned in the intake channel 40, upstream of the intake port 14, and a turbine 45 is positioned in the exhaust channel 42, downstream of the exhaust port 16. The compressor 44 and turbine 45 are mechanically coupled by a rotatable shaft 47. Together, the compressor 44, turbine 45, and rotatable shaft 47 form a turbocharger device 48, which operates in response to exhaust gas flowing from the exhaust port 16, through the exhaust channel 42, causing the turbine 45 to rotate, thereby rotating the compressor 44 via the rotatable shaft 47. When the compressor 44 rotates, atmospheric air flowing into the compressor 44 is pressurized and provided to the intake channel 40. The pressurized air flowing in the intake channel 40 to the intake port 14 is referred to as "charge air"; in some cases, charge air may comprise a portion of exhaust gas produced by the engine. A preferred turbocharger device 48 for the hydrogen-fueled opposed-piston engine is an assisted turbocharger in which an assist device 49 coupled to the rotatable shaft 47 provides power to the rotatable shaft 47. The assist device causes the turbocharger device 48 to boost provision of charge air in response to torque demands and accelerates the response of the turbine. The assist device 49 may use any turbocharger assist mechanism. For example, power may be provided to the rotatable shaft 47 by way of an electric motor, a hydraulic motor, a clutched, multispeed device coupled to a crankshaft, and so on.

The amount of charge air provided to the cylinder for scavenging and combustion is adjusted by varying the amount of power coupled to the turbocharger device 48 by the assist device 49. Variation of the power provided by the assist device 49 varies the speed of the compressor 44, which varies the mass flow of charge air provided through the intake channel 40, to the intake port 14. The pressure of the mass flow of charge air into the intake port 14 is referred to as "intake pressure". The amount of exhaust gas that exits the ported cylinder 12 through the exhaust channel 42 may be adjusted by varying the degree of opening of an exhaust backpressure valve 50, which is positioned in the exhaust channel 42, downstream of an outlet of the turbine 45. The exhaust backpressure valve 50 is opened and closed by an exhaust valve actuator 51.

As shown in FIG. 1, at least one fuel injection device 60 is supported at or mounted to a wall of the ported cylinder 12 and configured to inject hydrogen fuel ($H_2$) directly into the ported cylinder 12, between the end surfaces 20e and 22e. The number of fuel injection devices provided for injection of hydrogen fuel in the opposed-piston engine of the invention is a matter of design choice, which may call for one, two, or three or more fuel injection devices. At least one ignition device 62 is supported at or mounted to a wall of the ported cylinder 12 to deliver an ignition impulse into a combustion chamber defined in the cylinder bore 13 between the end surfaces 20e, 22e of the pistons. The ignition impulse ignites a mixture of charge air and hydrogen fuel in the combustion chamber. The number of ignition devices provided for igniting a mixture of charge air and hydrogen fuel in the opposed-piston engine of the invention is a matter of design choice, which may call for one, two, or three or more ignition devices. In the example shown in FIG. 1, a second fuel injection device 60a and/or a second ignition device 62b are provided. A fuel injection device may comprise hydrogen injector or a poppet valve. An ignition device may comprise an electrical device such as spark plug, a laser, or a glow plug, an active or passive pre-chamber, or a pilot ignition system.

An electronic engine control unit (ECU) 70 controls the operations of the assist device 49, exhaust valve actuator 51, the fuel injector device 60, and the ignition device 62. The ECU 70 comprises a programmable device programmed to execute fuel delivery algorithms, air and exhaust adjustment algorithms, and ignition algorithms under various engine operating conditions. Such algorithms are embodied in control modules and maps that are part of an engine systems control program executed by the ECU 70 while the hydrogen-fueled opposed-piston engine is operating. The ECU is programmed to determine a total charge air mass and a total hydrogen fuel mass required to meet a current engine condition (i.e., cold start, restart, idle, accelerate, decelerate). The ECU 70 controls the assist device 49 to adjust the speed of the compressor 44, thereby to achieve the determined total charge air amount. The ECU 70 controls an injection pattern and duration of the one or more fuel injectors 60 to obtain the required amount of hydrogen fuel. The charge air and hydrogen fuel amounts are constrained by the ECU 70 to maintain a charge air/hydrogen fuel balance within a specified lambda ($\lambda$) range, which ensures a desirably lean mixture of air and hydrogen fuel under most engine operating conditions. Ranges of lambda value for a hydrogen-fueled opposed-piston engine according to the invention may contain the value $\lambda=2.0$. For example, a preferred range of lambda for operation of the first embodiment hydrogen-fueled opposed-piston engine is [$2.0<\lambda<2.5$]; in another case, the lambda range would be [$\lambda=2.2\pm0.10$]. There may be instances, such as a high torque demand, where a relatively rich air/fuel mixture yields a lambda of less than 2.

The ECU 70 is electrically connected to a crankshaft position sensor, which provides a signal indicating a rotational angle of one of the crankshafts 30, 32 of the hydrogen-fueled opposed-piston engine 10. For example, as shown in FIG. 1, the ECU 70 receives from the crankshaft position sensor 72 a signal representing the rotational angle of the crankshaft 30. The rotational angle enables the ECU 70 to calculate engine speed and to execute injection and ignition operations by controlling the at least one fuel injector 60 and the at least one ignition device 62. For example, the ECU 70 controls the fuel injectors 60 and 60a and the ignition devices 62, 62a.

Under some engine operating conditions, combustion of hydrogen fuel can produce undesirable effects. For example, NOx may be produced at high combustion temperatures. In other circumstances, hydrogen fuel may be susceptible to being ignited by residual hot spots in the cylinder. Thus, it may be desirable to dilute an already lean charge-air/hydrogen-fuel mixture with residual exhaust in order to manage combustion. The exhaust produced by hydrogen combustion consists primarily of water ($H_2O$) and air ($O_2$, $N_2$, and other constituents), so dilution with exhaust produced by the hydrogen-fueled opposed piston engine can reduce production of NOx.

The hydrogen-fueled opposed-piston engine 10 may be provided with a means that functions to dilute a lean charge-air/hydrogen-fuel mixture by mixing exhaust gas produced by hydrogen combustion into the charge air introduced during scavenging. The means for diluting the lean charge air/hydrogen fuel can employ one of several methods of mixing exhaust gas with charge air. In these cases, the ECU 70 is further configured to control the dilution process. According to an exhaust gas retention method, exhaust gas that might otherwise be purged during scavenging is retained in the cylinder 12. The ECU 70 determines, from engine operating conditions, an amount of exhaust gas to be retained and controls the assist device 49 to reduce the speed of the turbocharger and/or operates the actuator 51 to adjust the position of the backpressure valve 50 to achieve the determined amount. According to an exhaust gas recirculation (EGR) method, exhaust gas is transported from the exhaust channel to be mixed with charge air delivered to the intake port of the cylinder. If EGR is provided, the precise EGR configuration is a matter of design choice. The EGR configuration may comprise a low-pressure EGR device, a high-pressure EGR device, or a hybrid EGR device. FIG. 1 illustrates a preferred EGR device embodiment comprising a high-pressure EGR channel 65, which recirculates an adjustable portion of exhaust gas from the exhaust channel 42 to be mixed with charge air in the intake channel 40. An EGR pump 66 is positioned in the high-pressure EGR channel 65 to adjust the amount of exhaust gas which is recirculated. The ECU 70 determines, from engine operating conditions an amount of exhaust gas to be recirculated and controls the EGR pump 66 to obtain the determined amount.

The hydrogen-fueled opposed-piston engine 10 according to the first embodiment uses hydrogen gas as fuel. Means and methods for supplying this type of fuel to a combustion chamber formed between the end surfaces 2oe, 22e in the bore 13 are shown in FIG. 1 and will be described in detail. The above-mentioned at least one fuel injection device 60 is used to inject hydrogen fuel ($H_2$) directly into the bore 13 of the ported cylinder 12 through a sidewall of the ported cylinder 12. Hydrogen fuel is provided to the one or more injector devices 62 from a hydrogen fuel provisioning device 80 through a fuel channel 82. The hydrogen fuel provisioning device 80 comprises a fuel tank constructed to contain hydrogen at high pressures, for example up to 700 bar or more. The provisioning device 80 may include a fuel pressure regulator in communication with the fuel tank to deliver compressed hydrogen gas to the at least one fuel injection device 60 in a range of regulated pressure. For example, hydrogen fuel may be delivered at a pressure ranging from 50 bar to 150 bar, or higher. Desirably, this range of hydrogen fuel pressure is well above the interior pressure of a ported cylinder when the intake and exhaust ports of the cylinder close at the end of scavenging. For example, presuming that the last port to close is the intake port, the interior pressure at the time when the intake port closes is the pressure of charge air being provided, which, for a diesel-powered opposed-piston engine designed for heavy duty use, may be in the range of 5 bar to 10 bar. Thus, a device to pump hydrogen fuel to the one or more injectors 60 may not be required.

Figure 2:
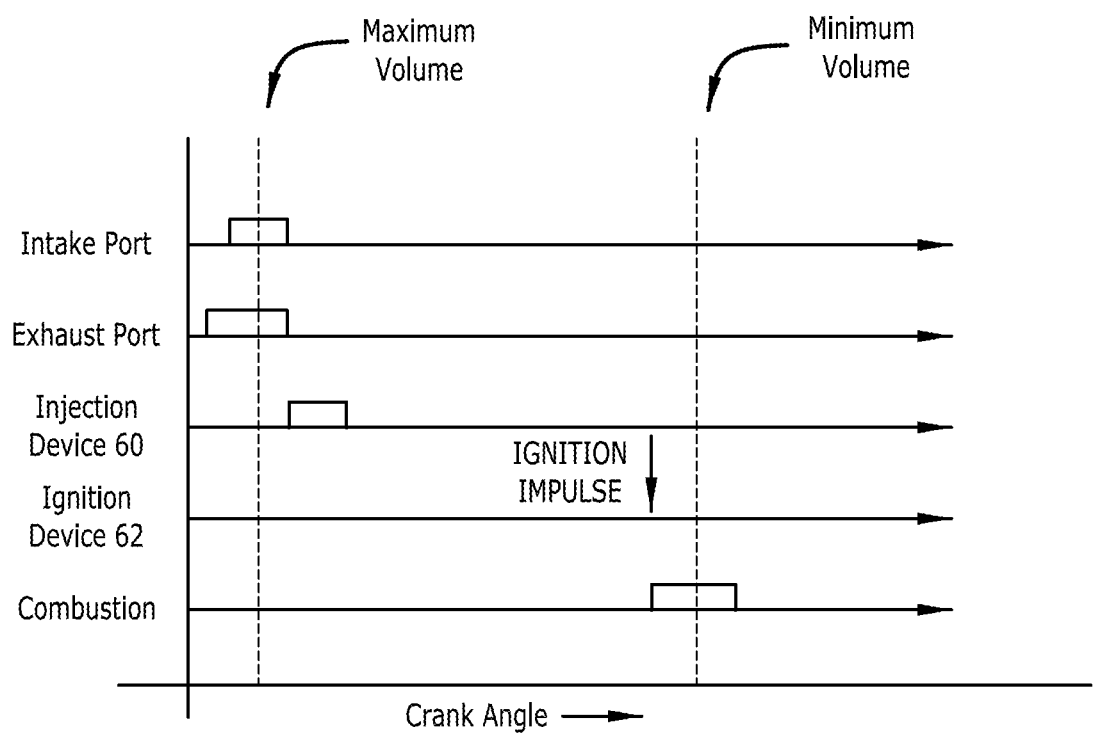
FIG. 2 is a graph illustrating the timing of injection, ignition, and combustion of hydrogen fuel with respect to port operations of the hydrogen-fueled opposed-piston engine of the invention.

FIG. 2 is a graph illustrating how the ECU 70 may control the timing of injection by the at least one fuel injection device 60, ignition of hydrogen fuel by the at least one ignition device 62, and combustion of hydrogen fuel with respect to operations of the intake and exhaust ports of the hydrogen-fueled opposed-piston engine of the invention. With reference also to FIG. 1, the horizontal axis of this graph represents the crank angle (CA) in degrees of rotation of the crankshaft 30 as indicated by the sensing device 72. In the case where the crankshaft 32 leads the crankshaft 30 by a specified crank angle, movement of the piston 22 to BC leads movement of the piston 20 to BC which causes the exhaust port 16 to open before the intake port 14. Fuel injection is performed by the at least one fuel injection device 60 during the compression stroke of a cycle of engine operation, at a time when the gas exchange process is completed or nears completion, which occurs at, or soon after the intake and exhaust ports 14, 16 are both closed. Presuming that closure of the intake port 14 indicates closure of both ports, soon after maximum volume occurs, the interior pressure of the cylinder is low, and fuel is directly injected by the one or more fuel injectors at or soon after this time. The pressure required to inject hydrogen fuel is lower than if injection were near the time of combustion (as would occur in the above type of diesel-fueled opposed-piston engine). Thus, hydrogen fuel tank pressure can be sufficient to drive injection, without sacrificing significant tank capacity, thereby eliminating the need for a hydrogen pump to directly inject fuel to the cylinder 12. Near the end of the compression stroke, the hydrogen fuel is well-mixed with the charge air and the air/fuel mixture is ignited with the at least one ignition device 62, preferably just before minimum volume for a combustion phasing corresponding to about 2-4 degrees CA after minimum volume for a 50% mass fraction burned for optimal efficiency.

The injection/ignition/combustion example illustrated in FIG. 2 can be adapted to particular applications of the hydrogen-fueled opposed-piston engine. Hydrogen injection need not be limited to start just at port closure; for example, it could start just before port closure if the at least one injector device 62 is positioned in or on the cylinder sidewall near the shaded minimum zone of the bore 13 seen FIG. 1. This position would provide a distance to each port sufficient to guarantee that both ports will be closed before the injected hydrogen fuel reaches them. Thus, in the broadest sense, injection of hydrogen fuel may be based on closure of a port, under the condition that it may occur shortly before, at the time of, or shortly after closure of the port. Duration of injection is a design choice. It depends on a current speed load point of engine operation, injection pressure, the number and flow capacity of injection devices, and cylinder pressure. A sample case for rated power on a heavy-duty vehicle application would be 60 CA degrees of duration.

Figure 3:
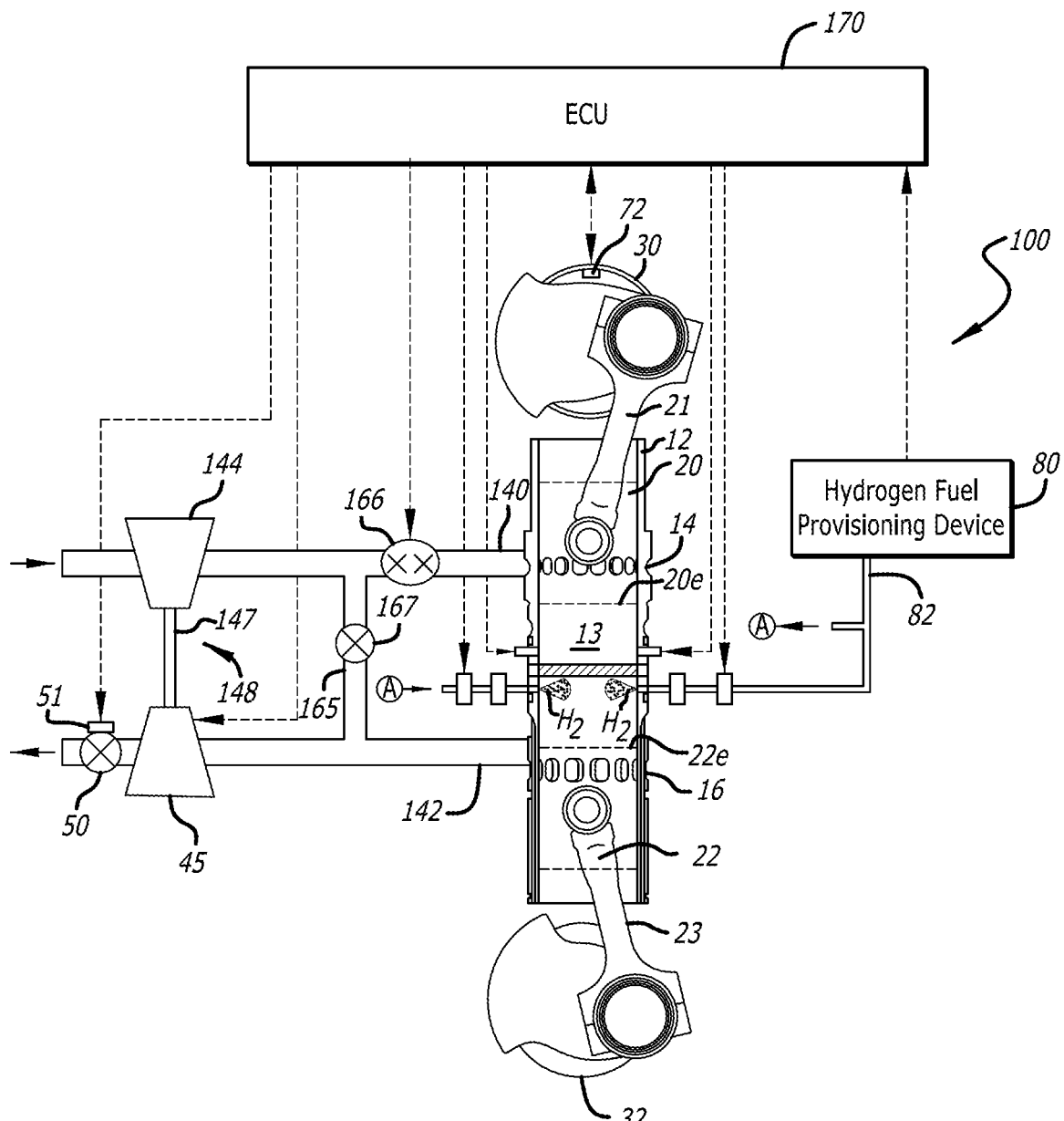
FIG. 3 is a schematic diagram which illustrates the configuration of the hydrogen-fueled opposed-piston engine according to a second embodiment.

A second embodiment of the hydrogen-fueled opposed-piston engine according to the invention is shown in FIG. 3. The second embodiment comprises a two-stroke-cycle uniflow scavenged opposed-piston engine 100, which is configured to combust hydrogen fuel. The hydrogen-fueled opposed-piston engine 100 corresponds essentially to the first embodiment hydrogen-fueled engine 10 in almost all respects, differing only in the manner in which charge air and exhaust gas are adjustably controlled.

As seen in FIG. 3, the ported cylinder 12 is provided with an intake channel 140 that conveys air to the intake port 14 and an exhaust channel 142 that conveys exhaust gas discharged through the exhaust port 16. A compressor 144 is positioned in the intake channel 140, upstream of the intake port 14, and a turbine 145 is positioned in the exhaust channel 142, downstream of the exhaust port 16. The compressor 144 and turbine 145 are mechanically coupled by a rotatable shaft 147. Together, the compressor 144, turbine 145, and rotatable shaft 147 form a turbocharger device 148, in which exhaust gas flowing from the exhaust port 16, through the exhaust channel 142, causes the turbine 145 to rotate, thereby rotating the compressor 144 via the rotatable shaft 147. When the compressor 144 rotates, atmospheric air flowing into the compressor 144 is pressurized and provided to the intake channel 142. The pressurized air flowing through the intake channel 142 is referred to as "charge air"; in some cases, charge air may comprise a portion of exhaust gas produced by the engine. A preferred turbocharger device 148 for the hydrogen-fueled opposed-piston engine 100 may comprise an adjustable turbine 145 with one or more integral devices which are actuated to vary a pressure across the turbine 145, thereby enabling a degree of control of the speed and the response of the turbocharger. Such turbine pressure control devices include variable geometry vanes and walls. Another adjustable turbine configuration may include a wastegate which is actuated to control the flow of exhaust gas to the turbine 144, which regulates rotational speed of the compressor. An adjustable supercharger device 166 is positioned in the air channel 140, downstream of the compressor 144, and upstream of the intake port 14. A preferred configuration of the adjustable supercharger device 166 may comprise an adjustable drive device which is actuated to vary the speed of the supercharger device, thereby enabling a degree of control of the speed and the response of the supercharger device. The adjustable supercharger device 166 may also include a bypass valve which is actuated to control flow of charge air through the supercharger device, which enables control of pressure across the hydrogen-fueled opposed-piston 100, control of boost in response to torque demands, and control of pressure to pump EGR to the intake port 14.

The amount of charge air provided to the ported cylinder 12 for scavenging and combustion is adjusted by regulation of the adjustable turbine 145 and the adjustable supercharger 166. Variation of the speed of the adjustable turbine 145 varies the speed of the compressor 144, which varies the mass flow of charge air provided to the supercharger 166. Variation of the speed of the adjustable supercharger 166 adjusts the mass flow of charge air through the intake channel 140, into the intake port 14. The pressure of the mass flow of charge air into the intake port 14 is referred to as "intake pressure".

An electronic engine control unit (ECU) 170 controls the operations of the adjustable turbocharger, the adjustable supercharger 166, the exhaust valve actuator 51, the fuel injector device 60, and the ignition device 62. The ECU 170 comprises a programmable device programmed to execute fuel delivery algorithms, air and exhaust adjustment algorithms, and ignition algorithms under various engine operating conditions. Such algorithms are embodied in control modules and maps that are part of an engine systems control program executed by the ECU 170 while the hydrogen-fueled opposed-piston engine is operating. The ECU 170 is programmed to determine a total charge air mass and a total hydrogen fuel mass required to meet a current engine condition (i.e., cold start, restart, idle, accelerate, decelerate). The ECU 170 controls the adjustable turbine 145 to adjust the speed of the compressor 144, thereby to provide a mass flow of charge air to the adjustable supercharger 166. The ECU 170 controls the adjustable supercharger 166 to thereby achieve the determined total charge air amount. The ECU 170 controls an injection pattern and duration of the one or more fuel injectors 60 to obtain the required amount of hydrogen fuel. The charge air and hydrogen fuel amounts are constrained by the ECU 170 to maintain a charge air/hydrogen fuel balance within a specified lambda ($\lambda$) range, which ensures a desirably lean mixture of air and hydrogen fuel under most engine operating conditions. For example, a preferred range of lambda for operation of the second embodiment hydrogen-fueled opposed-piston engine is [$2.0<\lambda<2.5$]; in another case, the lambda range would be [$\lambda=2.2\pm0.10$]. There may be instances, such as a high torque demand, where a relatively rich air/fuel mixture requires a lambda of less than 2. However, most ranges of lambda value for the hydrogen-fueled opposed-piston engine will contain the value $\lambda=2.0$.

The hydrogen-fueled opposed-piston engine 100 may be provided with a means that functions to dilute a lean charge-air/hydrogen-fuel mixture by mixing exhaust gas produced by hydrogen combustion with the charge air introduced during scavenging. The means for diluting the lean charge air/hydrogen fuel can employ one of several methods of mixing exhaust gas with charge air. In these cases, the ECU 70 is further configured to control the dilution process. According to an exhaust gas retention method, exhaust gas that might otherwise be purged during scavenging is retained in the cylinder 12. The ECU 170 determines, from engine operating conditions, an amount of exhaust gas to be retained and controls the pressure differential between intake port 14 and the exhaust port, by adjusting intake boost to control the scavenging. There are various methods to control the boost: an adjustable supercharger drive, a supercharger bypass valve, and/or an adjustable turbine device. According to an exhaust gas recirculation (EGR) method, exhaust gas is transported from the exhaust channel 142 to be mixed with charge air delivered to the intake port 14 of the cylinder. If EGR is provided, the precise EGR configuration is a matter of design choice. The EGR configuration may comprise a low-pressure EGR device, a high-pressure EGR device, or a hybrid EGR device. FIG. 3 shows a preferred EGR device embodiment. This EGR embodiment comprises a high-pressure EGR channel 165, which recirculates an adjustable portion of exhaust gas from the exhaust channel 142 to be mixed with charge air in the intake channel 140. An EGR valve 167 is positioned in the high-pressure EGR channel 165 to adjust the amount of exhaust gas which is recirculated. The ECU 170 determines, from engine operating conditions an amount of exhaust gas to be recirculated and controls the EGR valve 167 and the adjustable supercharger 166 to obtain the determined amount.

The graph of FIG. 2 also illustrates the timing of injection by the at least one fuel injection device 60, ignition of hydrogen fuel by the at least one ignition device 62, and combustion of hydrogen fuel with respect to operations of the intake and exhaust ports of the hydrogen-fueled opposed-piston engine 100 of the second embodiment.

Use of hydrogen fuel may confer additional benefits in the design and construction of opposed-piston engines. Piston constructions for diesel-fueled two-stroke cycle opposed-piston engines utilize crowns having contoured end surfaces that interact with charge air swirl in the cylinder and with squish flow from the periphery of the combustion chamber. The interaction occurs near minimum volume when fuel is injected, usually from diametrically opposed locations, across the longitudinal axis of the cylinder. The interaction produces complex, turbulent charge air motion that encourages air/fuel mixing. This type of piston is disclosed, for instance, by US Patent Application Publication 2011/0271932, US Patent Application Publication 2014/0014063, and US Patent Application Publication 2017/0030262. These type pistons are expensive to construct and install, and pose challenges in thermal management.

In contrast, the high diffusion coefficient of hydrogen fuel injected early, enables good air/fuel mixing well in advance of combustion. Since air/fuel mixing does not need to occur during combustion, as with a diesel-fueled opposed-piston engine, the combustion chamber shape of a hydrogen-fueled opposed-piston engine can be simplified. As illustrated in FIGS. 1 and 3, a pair of pistons 20, 22 with flat end surfaces 20e, 22e may be sufficient to create a direct communication between an ignition source located on the periphery of the combustion chamber and the rest of the combustion chamber.

Figure 4B:
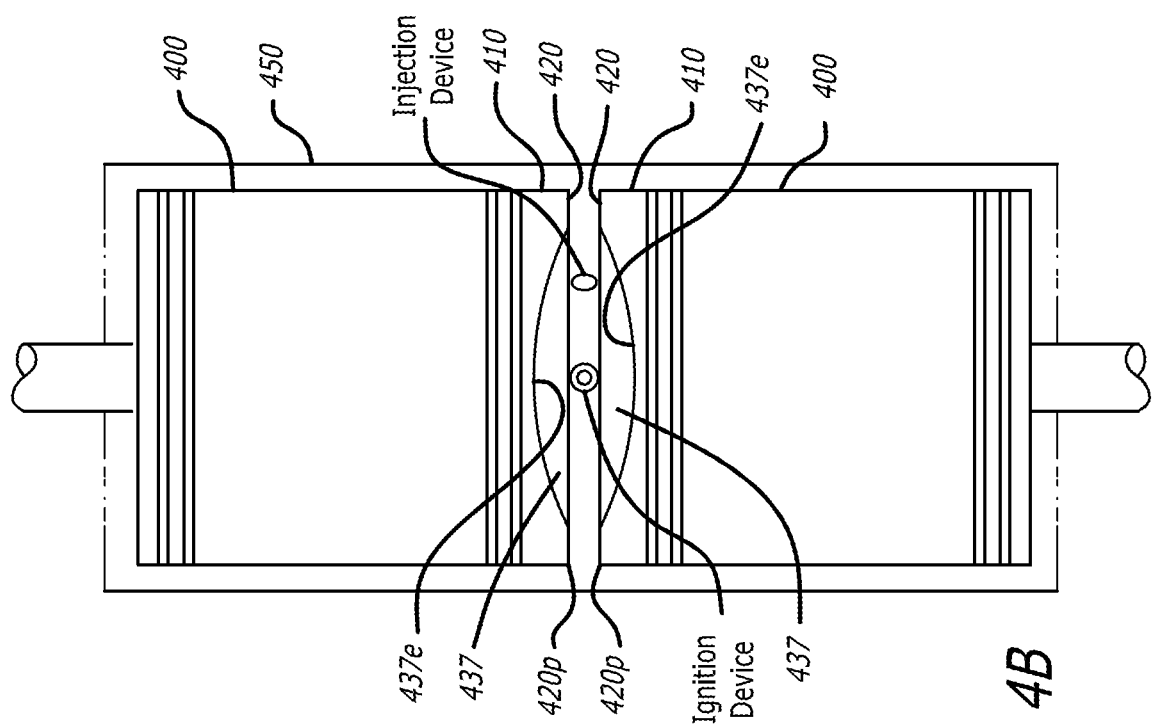
FIGS. 4A and 4B are schematic diagrams which illustrate a piston end surface embodiment for the hydrogen-fueled opposed-piston engine of the invention.
Figure 4A:
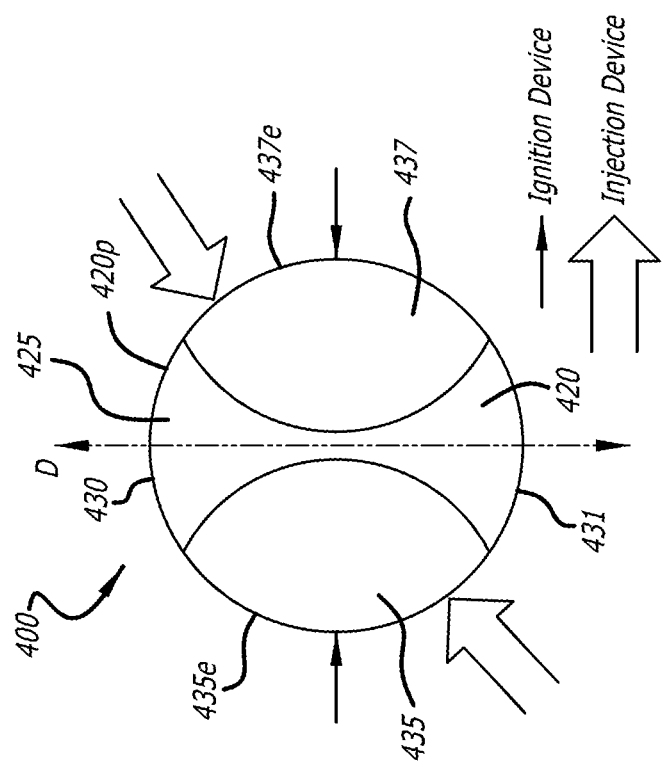

Another approach to piston construction for a hydrogen-fueled opposed-piston engine may be to concentrate the combustion chamber volume closer to the ignition source to take advantage of the rapid flame propagation of hydrogen fuel. This approach is illustrated in FIGS. 4A and 4B, in which FIG. 4A is a schematic illustration of the end view of each piston of a pair of pistons of a hydrogen-fueled opposed-piston engine showing a shape of the end surface of the piston, and FIG. 4B is a schematic illustration showing the pair of pistons disposed in opposition in the bore of a cylinder of a hydrogen-fueled opposed-piston engine. As shown in FIGS. 4A and 4B, each piston 400 comprises a crown 410 with an end surface 420. The end surface 420 comprises a perimeter 420p, and a mesa-like structure 425 forming a generally hourglass-shaped central portion 427 extending in a diametrical direction D of the end surface 420, between opposing arcuate sections 430, 431 of the perimeter 420p. The hourglass shape of the central portion 427 defines a pair of concave bowls 435, 437 in the end surface 420 with edges 435e, 437e along the perimeter 420p, the bowls being curved in opposing directions, inwardly of the perimeter 420pr.

In FIG. 4B, the pistons 400 are shown disposed in opposition in the bore of a cylinder 450 of the opposed-piston engine, near their minimum volume locations. Both of the pistons 400 have the end surface shape shown in FIG. 4A, and are disposed with their respective concave bowls 435, 437 aligning. Presume that the hydrogen-fueled opposed-piston engine is constructed with two diametrically-opposed injection devices and two diametrically opposed ignition devices per cylinder 450. Each injection device has a companion ignition device and both devices are aimed toward a respective pair of aligned bowls. As the pistons 400 come to minimum volume, each set of aligned concave bowls creates a combustion volume around a respective ignition device. This is best seen in FIG. 4B, where the aligned concave bowls 437 create a combustion volume around one of the two ignition devices, with the understanding that the same effect is produced by the aligned concave bowls 435 on the unseen side of the pair of pistons. The aligned central portions 427 of the pistons 400 also enhance air/fuel mixing by dividing the swirl as the pistons 400 come to minimum volume.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An opposed-piston engine, comprising:
at least one ported cylinder with a bore;
a pair of pistons disposed for mutually opposing movements in the bore;
an air intake channel configured to provide a flow of charge air through an intake port of the cylinder in response to movement of a first piston of the pair of pistons past the intake port;
an exhaust channel configured to receive a flow of exhaust gas through an exhaust port of the cylinder in response to movement of a second piston of the pair of pistons past the exhaust port;
a hydrogen fuel provisioning device configured to provide hydrogen fuel at a pressure in a range of 50 bar to 150 bar;
at least one fuel injection device coupled to the hydrogen fuel provisioning system and configured to inject the provided hydrogen fuel directly into the cylinder bore; and,
at least one ignition device configured to ignite a mixture of charge air and injected hydrogen fuel in a combustion chamber formed in the bore between end surfaces of the pair of pistons.

2. The opposed-piston engine of claim 1, further comprising a control unit coupled to the fuel injection device and to the ignition device and configured to:
initiate injection of the provided hydrogen fuel near the beginning of a compression stroke of the engine in response to closure of a designated one of the intake port and the exhaust port; and,
initiate combustion of the mixture of charge air and injected hydrogen fuel near the end of the compression stroke of the engine.

3. The opposed-piston engine of claim 2, wherein the ignition device comprises at least one spark plug positioned to ignite the mixture of charge air and injected hydrogen fuel in the combustion chamber.

4. The opposed-piston engine of claim 2, wherein the control unit is configured to cause the at least one fuel injection device to inject the provided hydrogen fuel based on closure of the intake port by the first piston.

5. The opposed-piston engine of claim 1, further including means for diluting the mixture of charge air and injected hydrogen fuel.

6. The opposed-piston engine of claim 1, wherein each of the first piston and the second piston comprises a crown with a substantially flat end surface.

7. The opposed-piston engine of claim 1, wherein the ignition device comprises at least one spark plug positioned to ignite the mixture of charge air and injected hydrogen fuel in the combustion chamber.

8. The opposed-piston engine of claim 5, wherein the means for diluting the mixture comprises an EGR channel.

9. The opposed-piston engine of claim 1, wherein each of the first piston and the second piston comprises a crown with an end surface, the end surface comprising a perimeter, and a structure with a generally hourglass-shaped central portion extending in a diametrical direction of the end surface, between opposing arcuate sections of the perimeter, the hourglass shape of the central portion defining a pair of concave bowls in the end surface with edges curved in opposing directions, inwardly of the perimeter.

10. The opposed-piston engine of claim 2, wherein each of the first piston and the second piston comprises a crown with an end surface, the end surface comprising a perimeter, and a structure with a generally hourglass-shaped central portion extending in a diametrical direction of the end surface, between opposing arcuate sections of the perimeter, the hourglass shape of the central portion defining a pair of concave bowls in the end surface with edges curved in opposing directions, inwardly of the perimeter.

11. The opposed-piston engine of claim 2, wherein each of the first piston and the second piston comprises a crown with a substantially flat end surface.

12. A hydrogen-fueled, two-stroke-cycle, uniflow-scavenged opposed-piston engine, comprising:
at least one ported cylinder with a bore;
a pair of pistons disposed for mutually opposing movements in the bore;
an air channel configured to provide a flow of charge air through an intake port of the cylinder in response to movement of a first piston of the pair of pistons past the intake port;
an exhaust channel configured to receive a flow of exhaust gas through an exhaust port of the cylinder in response to movement of a second piston of the pair of pistons past the exhaust port;
means for adjusting the flow of charge air;
a fuel provisioning device configured to provide hydrogen fuel;
at least one fuel injection device coupled to the fuel provisioning system and configured to inject the provided hydrogen fuel directly into the cylinder bore;
at least one ignition device configured to ignite a mixture of charge air and injected hydrogen fuel in a combustion chamber formed in the bore between end surfaces of the pair of pistons; and, a control unit coupled to the at least one fuel injection device and the means for adjusting charge air, which is configured to cause the hydrogen-fueled, two-stroke-cycle, uniflow-scavenged opposed-piston engine to combust the hydrogen fuel while operating with a lambda (λ) of 2.0<λ<2.5.

13. The hydrogen-fueled, two-stroke-cycle, uniflow-scavenged opposed-piston engine of claim 12, wherein the control unit is connected to the at least one fuel injection device and to the at least one ignition device, and is configured to:
initiate injection of the provided hydrogen fuel early in a compression stroke of the hydrogen-fueled, two-stroke-cycle, uniflow-scavenged opposed-piston engine based on closure of a designated one of the intake port and the exhaust port; and,
initiate combustion of the mixture of charge air and injected hydrogen fuel near the end of the compression stroke.

14. The hydrogen-fueled, two-stroke-cycle, uniflow-scavenged opposed-piston engine of claim 13, wherein the means for adjusting the flow of charge air comprises an assisted turbocharger with a turbine positioned in the exhaust channel and a compressor positioned in the air channel.

15. The hydrogen-fueled, two-stroke-cycle, uniflow-scavenged opposed-piston engine of claim 14, further comprising means for diluting the mixture of charge air and injected hydrogen fuel.

16. The hydrogen-fueled, two-stroke-cycle, uniflow-scavenged opposed-piston engine of claim 15, wherein the at least one ignition device comprises at least one spark plug positioned to ignite the mixture of charge air and injected hydrogen fuel in the combustion chamber.

17. The hydrogen-fueled, two-stroke-cycle, uniflow-scavenged opposed-piston engine of claim 13, further comprising means for diluting the mixture of charge air and injected hydrogen fuel.

18. The hydrogen-fueled, two-stroke-cycle, uniflow-scavenged opposed-piston engine of claim 13, wherein the at least one ignition device comprises at least one spark plug positioned to ignite the mixture of charge air and injected hydrogen fuel in the combustion chamber.

19. The hydrogen-fueled, two-stroke-cycle, uniflow-scavenged opposed-piston engine of claim 13, wherein the control unit is configured to cause the at least one fuel injection device to inject the provided hydrogen fuel based on closure of the intake port by the first piston.

20. The hydrogen-fueled, two-stroke-cycle, uniflow-scavenged opposed-piston engine of claim 12, wherein the means for adjusting the flow of charge air comprises an assisted turbocharger with a turbine positioned in the exhaust channel and a compressor positioned in the air channel.

21. The hydrogen-fueled two-stroke-cycle, uniflow-scavenged opposed-piston engine of claim 12, further comprising means for diluting the mixture of charge air and injected hydrogen fuel.

22. The hydrogen-fueled, two-stroke-cycle, uniflow-scavenged opposed-piston engine of claim 12, wherein the at least one ignition device comprises at least one spark plug positioned to ignite the mixture of charge air and injected hydrogen fuel in the combustion chamber.

* * * * *